US006590900B1

(12) United States Patent
Peting et al.

(10) Patent No.: US 6,590,900 B1
(45) Date of Patent: Jul. 8, 2003

(54) TIME AND SPACE SLICED NON-BLOCKING NETWORK SWITCHING FABRIC

(75) Inventors: Mark Peting, Tigard, OR (US); James Arthur Jackson, Beaverton, OR (US)

(73) Assignee: PMC-Sierra Ltd., Burnaby (CA)

( * ) Notice: Subject to any disclaimer, the term of this patent is extended or adjusted under 35 U.S.C. 154(b) by 0 days.

(21) Appl. No.: 09/212,705

(22) Filed: Dec. 16, 1998

(51) Int. Cl.[7] ................................................. H04Q 7/00
(52) U.S. Cl. .................. 370/428; 370/395.71; 370/412; 370/413
(58) Field of Search ................................. 370/352, 353, 370/389, 394, 395.52, 395.53, 395.6, 395.61, 395.63, 395.64, 395.65, 395.71, 395.72, 412, 413, 415, 417, 428, 465, 466, 469, 474

(56) References Cited

U.S. PATENT DOCUMENTS

| | | | |
|---|---|---|---|
| 3,956,593 A | 5/1976 | Collins et al. | 370/371 |
| 4,005,272 A | 1/1977 | Collins et al. | 370/361 |
| 4,038,497 A | 7/1977 | Collins et al. | 370/361 |
| 5,168,492 A | 12/1992 | Beshai et al. | 370/353 |
| 5,513,134 A | 4/1996 | Cooperman et al. | 365/49 |
| 6,111,880 A * | 8/2000 | Rusu et al. | 370/395.53 |
| 6,233,245 B1 * | 5/2001 | Chapman et al. | 370/412 |
| 6,243,382 B1 * | 6/2001 | O'Neill et al. | 370/395.52 |

OTHER PUBLICATIONS

T. Feng, "A Survey of Interconnection Networks", IEEE Computer, Dec. 1981, pp. 12–27.

* cited by examiner

Primary Examiner—Ken Vanderpuye
Assistant Examiner—Phirin Sam
(74) Attorney, Agent, or Firm—Oyen Wiggs; Green & Mutala

(57) ABSTRACT

A method and apparatus for switching n data streams for input and output of the data streams by an n input, n output data store without data loss. The data store is divided into n separate storage arrays and each data stream is divided into n equal-sized pieces. Then, during each one of n separate time units, one data stream piece is written into a corresponding one of the storage arrays; or, one data stream piece is read from a corresponding one of the storage arrays. For each data stream, during each time unit i, where $1 \leq i \leq n$ an $i^{th}$ data stream piece is written into an $i^{th}$ one of the storage arrays, or an $i^{th}$ piece is read from an $i^{th}$ storage array. During each $j^{th}$ time unit, where $1 \leq j \leq n$, one data stream piece $P_{ij}$ is written into an $i^{th}$ storage array, or one piece $P_{ij}$ is read from an $i^{th}$ storage array. Before the writing or reading step, each data stream is shifted $\log_2 n$ separate stages, such that for each shifting stage each data stream is shifted by:

$_2(\log_2 n)^{-1}$ bits in the first shifting stage;

$_2(\log_2 n)^{-2}$ bits in the second shifting stage; . . . ; and, 1 bit in the $n^{th}$ shifting stage.

2 Claims, 2 Drawing Sheets

TIME AND SPACE SLICED NON-BLOCKING NETWORK SWITCHING FABRIC

TECHNICAL FIELD

This invention is directed to an expandable data switching fabric using a shared memory architecture. Data is commutated with respect to both space and time to facilitate input and output of multiple high speed switched data streams without data loss.

BACKGROUND

Considerable attention has been devoted to the study of interconnection networks. See, for example, T. Feng., "A Survey of Interconnection Networks", IEEE Computer, December 1991, pp. 12–27. Several network topologies have been proposed for designing parallel computers and computer communication networks.

A static interconnection network is characterized by point-to-point links which connect various nodes based upon a given structure. Common examples of static interconnection network topologies include bus, ring, mesh, crossbar, tree, hypercube and hypercycle topologies. Many static interconnection networks are multi-stage networks having no central or shared memory for storing the data which passes through the network. Additionally, most static interconnection networks have statically allocated resources for switching data through the network.

Typically, data is passed through a prior art static interconnection network by time-dividing the data path into a number of discrete sub-paths, with each sub-path being used during a specific, corresponding time slice. See, for example, U.S. Pat. Nos. 3,956,593; 4,005,272; and, 4,038,497. By contrast, the present invention passes data by dynamically allocating the network's data switching resources and by time-dividing the data such that the entire data path can be used during all time slices.

Another prior art approach uses a shared memory architecture. Typically, a content-addressable central, shared memory is used, but without commutation. See, for example, U.S. Pat. No. 5,513,134. Prior art techniques for commutation of switched data have also been devised, as exemplified by U.S. Pat. No. 5,168,492. However, the '492 patent uses a rotator to commutate the data, whereas the present invention employs a barrel shifter and commutates the data with respect to both space and time.

SUMMARY OF INVENTION

In accordance with the preferred embodiment, the invention provides a method of switching n data streams for input and output of the data streams by an n input, n output data store without data loss. This is accomplished by dividing the data store into n separate storage arrays and dividing each of the data streams into n equal-sized pieces. Then, during each one of n separate time units, one of the data stream pieces is written into a corresponding one of the storage arrays; or, one of the data stream pieces is read from a corresponding one of the storage arrays.

Preferably, for each data stream, during each time unit $i$, where $1 \leq i \leq n$, an $i^{th}$ data stream piece is written into an $i^{th}$ one of the storage arrays, or an $i^{th}$ piece is read from an $i^{th}$ storage array. During each $j^{th}$ time unit, where $1 \leq j \leq n$, one data stream piece $P_{ij}$ is written into an $i^{th}$ storage array, or one piece $P_{ij}$ is read from an $i^{th}$ storage array.

Advantageously, before the writing or reading step, each data stream is shifted in $\log_2 n$ separate stages, with each shifting stage respectively comprising shifting each one of the data streams by:

$_2(\log_2 n)^{-1}$ bits in the first shifting stage;
$_2(\log_2 n)^{-2}$ bits in the second shifting stage; . . . ; and,
1 bit in the $n^{th}$ shifting stage.

The invention further provides apparatus for switching n data streams for input and output of the data streams without data loss. The apparatus incorporates an n input, n output data store subdivided into n separate storage arrays; means for dividing each data stream into n equal-sized pieces and for writing each piece into a corresponding one of the storage arrays during each one of n separate time units; and, means for reading each written piece from the respective storage arrays during each one of another n separate time units and for combining the read pieces to reform a corresponding one of the data streams.

The means for dividing the data streams and for writing the pieces, and the means for reading the written pieces and for combining the read pieces, may each comprise a shifting means for shifting each data stream in $\log_2 n$ separate stages, with each shifting stage respectively comprising shifting each one of the data streams by:

$_2(\log_2 n)^{-1}$ bits in the first shifting stage;
$_2(\log_2 n)^{-2}$ bits in the second shifting stage; . . . ; and,
1 bit in the $n^{th}$ shifting stage.

DESCRIPTION

The invention will be described in the context of a switching architecture interconnecting eight 1 Gigabit per second data streams. To ensure non-blocking operation (i.e. data switching with no loss of data) the switching architecture must be able to receive eight 1 Gigabit per second input data streams; and, transmit eight 1 Gigabit per second output streams without loss of data.

It is well known that, during operation of a typical inter-connection network, various pathological input/output patterns tend to focus one or more input data streams on a particular output data stream; and/or, require multiple output data streams to be sourced from a particular input data stream. To achieve non-blocking operation, a data stream store must be implemented in such a way that no data is lost in such focused traffic situations. A static memory storage scheme (for example a scheme employing a plurality of first-in-first-out input/output buffers) would require more storage than is economical to implement. To reduce storage requirements, the invention uses a dynamically allocated memory scheme (a large central memory) as the data stream store.

Because the invention places a single central memory resource in the data path, care must be taken to resolve memory contention problems which arise as multiple data streams "compete" for allocation of storage space within the single memory resource. Each input data stream and each output data stream must be guaranteed a path to and from the data store without blocking. This is achieved by slicing the input data streams both in time and space and recombining them before the streams are output.

The dimensions of a switching fabric define the number of data streams it can support. If a switching fabric can support n data streams, then to take advantage of a switching architecture in accordance with the invention, the data store is divided into n independent storage arrays. Additionally, each data stream is divided into n equal-sized pieces, with each piece being written into a corresponding one of the n storage arrays over the course of n time units. By writing n pieces of n data streams into n storage arrays over the course of n time units, the invention ensures that each input data stream has an independent and guaranteed time/space slice of the switching fabric.

Figure 1:
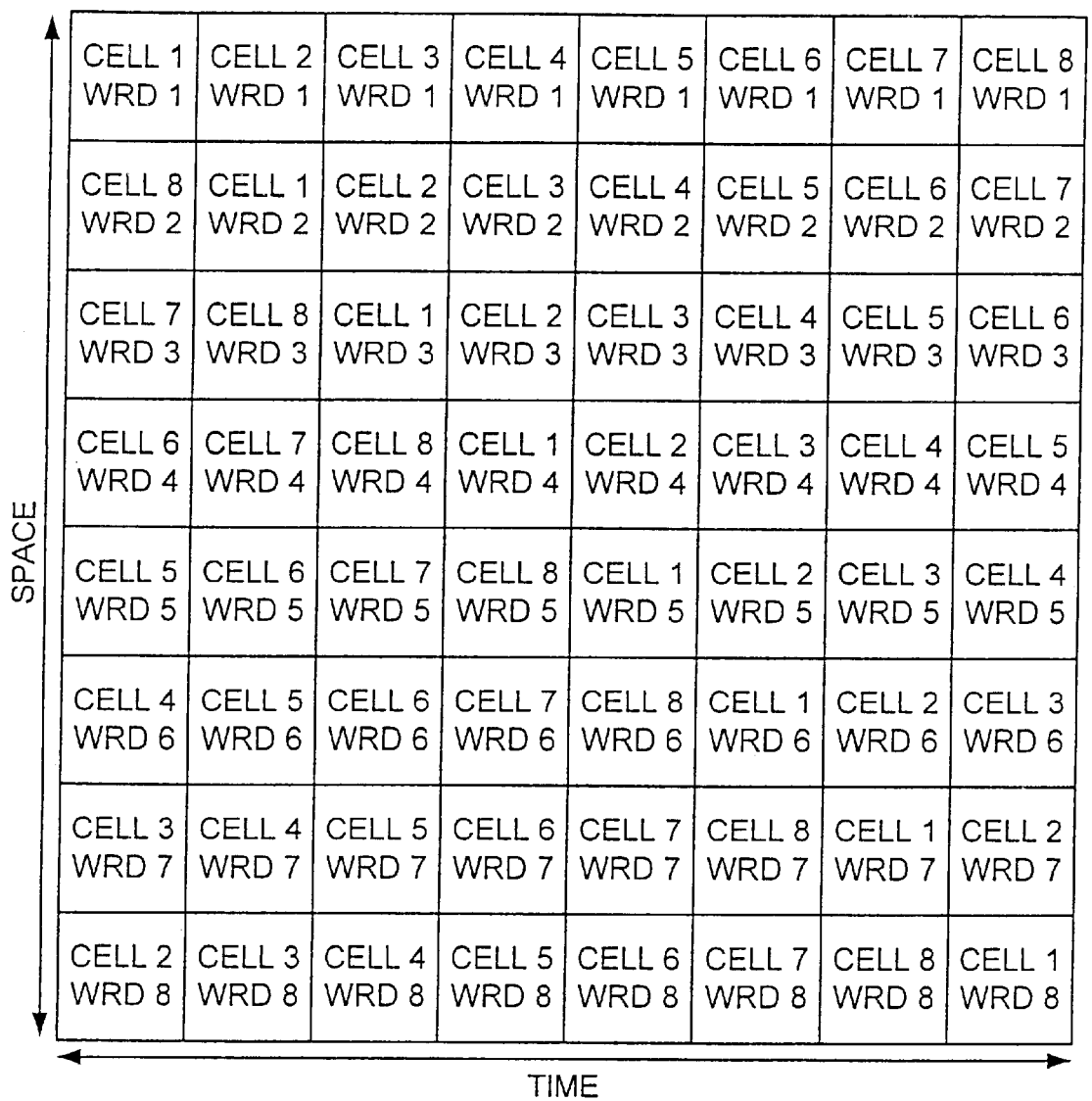
FIG. 1 depicts an n by n data memory storage and time sliced architecture in accordance with the invention, for the case n=8.

FIG. 1 schematically depicts the way in which the data streams and the data store are sliced, for the case n=8. Slicing is accomplished at several points in the data path. Specifically, in the case where n=8, the data store is divided (i.e. sliced) into 8 separate storage arrays, one for each of the 8 input/output streams. Each one of the 8 horizontally extending rows depicted in FIG. 1 corresponds to one of the aforementioned storage arrays. Each one of the 8 input/output data streams is time-sliced into 8 separate pipelined pieces, with each piece being allocated for storage in a different one of the 8 separate storage arrays. Each one of the 8 vertically extending columns depicted in FIG. 1 corresponds to one of the aforementioned time-slices.

As seen in FIG. 1, each one of the 8 storage arrays consists of 8 individual storage blocks, with each such block being capable of storing a single 4 byte data word. As noted above, each data stream is divided into n equal-sized pieces. That is, each one of the 8 separate pipelined pieces is the same size (i.e. one 4 byte data word, in the example depicted in FIG. 1). To ensure that the pipelined pieces are of equal size, the incoming data stream is also divided into equal-sized pieces. Thus, at the input stage, the input stream is divided into 32-byte "cells".

Each 32-byte cell in the incoming data stream is time-sliced into 8 separate pipelined pieces. Each such piece consists of a single 4 byte word. Thus, with reference to FIG. 1, each 32-byte cell consists of 8 words designated "Word 1", "Word 2", . . . "Word 8". Since there are 8 input data streams, there are 8 32-byte cells, one for each data stream. As noted above, each pipelined piece is stored in a different one of the 8 separate storage arrays over the course of 8 time units. Thus, the data storage block at the intersection of the top "space" row with the left "time" column is marked "Cell 1, Word 1", signifying that during the first time unit the first word of the first cell (i.e. the first 4 byte word of the 32-byte cell derived from the first of the 8 input data streams) is stored in that block. The data storage block to the immediate right of the "Cell 1, Word 1" block is marked "Cell 2, Word 1", signifying that during the second time unit the first word of the second cell (i.e. the first 4 byte word of the 32-byte cell derived from the second of the 8 input data streams) is stored in that block. The data storage block immediately beneath the "Cell 1, Word 1" block is marked "Cell 8, Word 2", signifying that during the first time unit the second word of the eighth cell (i.e. the second 4 byte word of the 32-byte cell derived from the eighth of the 8 input data streams) is stored in that block, etc.

Once the space (i.e. the central data store) and the time (i.e. pipelined input streams) have been sliced, it becomes necessary to determine how to write and read the data streams to and from the central data store. Since both time and space are sliced, it is necessary, during each time slice, to read (or write) a particular data element into its corresponding space slice. The "cell clock time" required to write (or read) a cell into the central data store is divided into n separate memory cycles. Because each input data stream is divided into n pieces, with each piece being written into a different one of n separate storage arrays, it is necessary to write data into (or read data from) all n storage arrays each time a 32-byte cell is transferred to (or from) the data store. These write (or read) operations are coordinated such that each input/output stream is written to (or read from) a separate storage array during each memory cycle, and such that all streams are written to (or read from) each storage array at the completion of a cell clock time.

Figure 2:
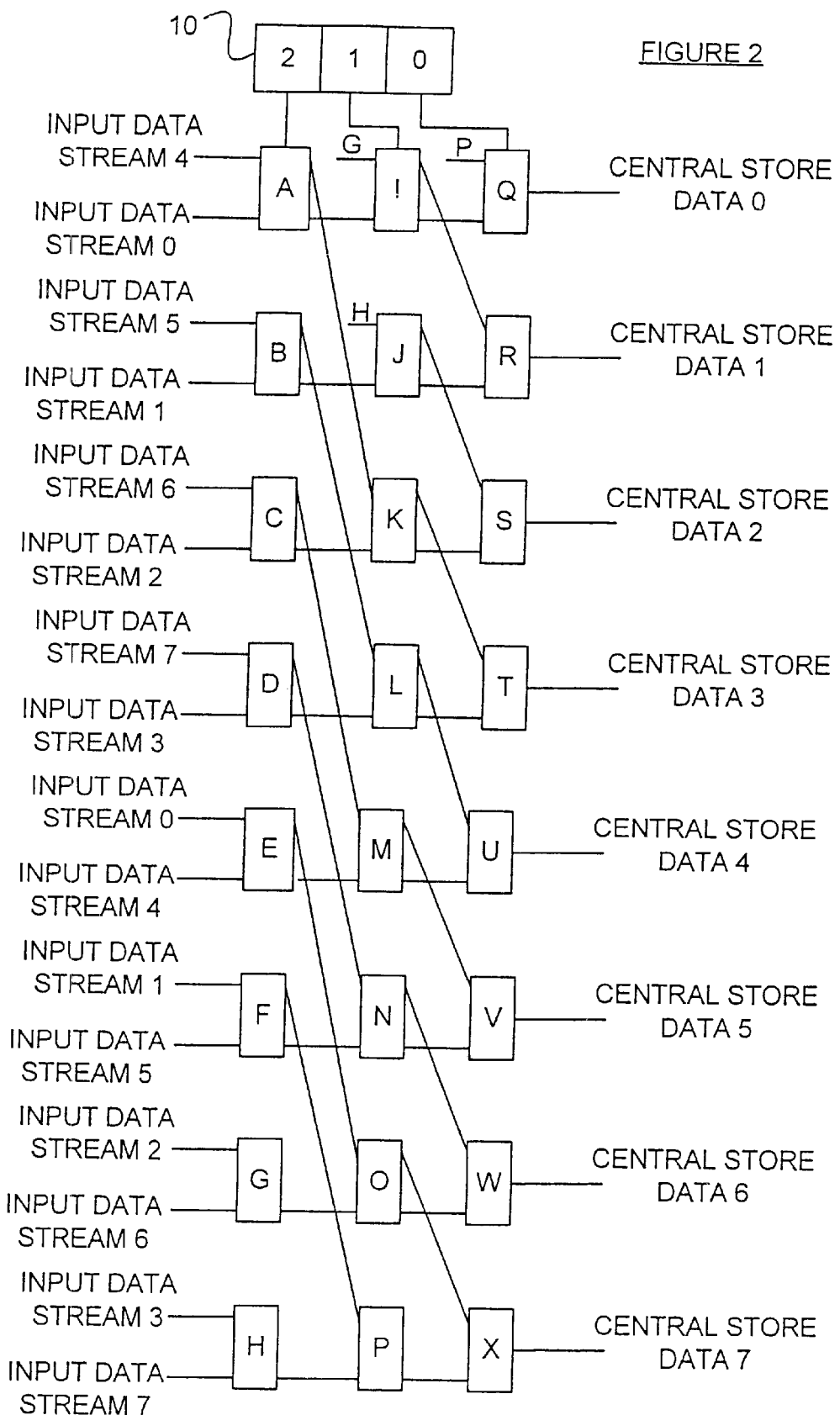
FIG. 2 depicts a $\log_2 n$ stage barrel shifter in accordance with the invention, for the case n=8.

The mechanism used to write (or read) the n data slices to (or from) the n-way central store is a $\log_2 n$-stage barrel shifter, depicted in FIG. 2. The central store is preferably implemented as a dual port random access memory (RAM), with the store's input side corresponding to the RAM write ports and with the store's output side corresponding to the RAM read ports. Two barrel shifters are required, one for the store's input side and another for the store's output side. Input data passes through the input side barrel shifter before entering the central store. Data output from the central store passes through the output side barrel shifter. Since the operation of the two barrel shifters is identical, the following discussion focuses only on the operation of the input side barrel shifter, it being understood that the central store's input and output sides are configured to preclude simultaneous input and output operations being performed on the same storage location.

Barrel shifters are also known as "plus-minus-$2^i$" or "PM2I" networks, and are characterized by the following routing functions:

$$B_{+i}(j)=(j+2_i)(\mathrm{mod}\ N)$$

$$B_{-i}(j)=(j-2_i)(\mathrm{mod}\ N)$$

where $0 \leq j \leq N-1$, $0 \leq i \leq n-1$, and $n=\log_2 N$. In less mathematical terms, each stage N of a barrel shifter shifts its input data by $\log_2 N$. For the case where n=8, it can be seen that N=3. That is, a three stage barrel shifter as depicted in FIG. 2 is required for the case where n=8.

The barrel shifter is composed of n $\log_2 n$ elements labelled "A" through "X" in FIG. 2 (i.e. 24 elements in the case where n=8, since 8 $\log_2 8$=24). Each element consists of a two-input multiplexer. The first stage of the barrel shifter is made up of elements "A" through "H", the second stage is made up of elements "I" through "P" and the third stage is made up of elements "Q" through "X".

Each of the first stage elements "A" through "H" shifts its input by either 4 or 0 "data lanes"; each of the second stage elements "I" through "P" shifts its input by either 2 or 0 data lanes; and, each of the third stage elements "Q" through "X" shifts its input by either 1 or 0 data lanes. A shift of 0 data lanes simply means that the input data is passed directly through the element to the adjacent element in the next sequential stage. For example, the line connecting first stage element "A" to second stage element "I" corresponds to the case in which element "A" shifts its input by 0 data lanes; and, the line connecting first stage element "A" to second stage element "K" corresponds to the case in which element "A" shifts its input by 4 data lanes.

Each one of the 8 incoming data streams must have a path through the network to each one of the 8 output ports. Thus, data must be shifted by 0 up to 7 lanes to guarantee that each input can connect to each output. The following table shows how the three stages of the FIG. 2 barrel shifter can be configured to accomplish this:

| Data Lanes to be Shifted | 1st Stage Shift | 2nd Stage Shift | 3rd Stage Shift |
| --- | --- | --- | --- |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 | where a "0" in any of the first, second or third stage shift columns means a 0 data lane shift, as explained above; and, a "1" means a shift of 4 data lanes for the first stage, 2 data lanes for the second stage and 1 data lane for the third stage. The above table reveals that a simple three bit binary counter 10 can be used (for the case where n=8) to supply the select signals for each of the multiplexers which make up the barrel shifter.

The two inputs of each of the first stage multiplexers "A" through "H" are connected to receive the respective incoming data streams, as indicated in FIG. 2. Thus, one input of multiplexer element "A" is connected to receive data stream 4 and the other input of multiplexer element "A" is connected to receive data stream 0, etc. The two inputs of each of the second stage multiplexers "I" through "P" are connected to receive either 4-lane shifted or 0-lane shifted outputs from the first stage, as previously explained. Similarly, the two inputs of each of the third stage multiplexers "Q" through "X" are connected to receive either 2-lane shifted or 0-lane shifted outputs from the second stage. The outputs of the third stage multiplexers "Q" through "X" are connected to the respective storage arrays into which the central store is divided, as indicated in FIG. 2. Thus, the output of multiplexer element "Q" is connected to the first such array (denoted "central data store 0" in FIG. 2), etc.

It can thus be seen that, in general, the $\log_2 n$ stages of the barrel shifter shift the incoming data streams by:

$$_2(\log_2 n)^{-1}, \,_2(\log_2 n)^{-2}, \ldots, 1$$

positions respectively with a $\log_2 n$-bit counter being used to actuate the multiplexer select lines. Thus, as depicted in FIG. 2 for the case where n=8, counter 10 is a three bit counter, since $\log_2 8=3$. The least significant bit of counter 10 (i.e. the rightmost bit, as viewed in FIG. 2) is connected to actuate the select lines of the third stage multiplexers "Q" through "X". The next most significant bit of counter 10 is connected to actuate the select lines of the second stage multiplexers "I" through "P"; and, the most significant (i.e. leftmost) bit of counter 10 is connected to actuate the select lines of the first stage multiplexers "A" through "H". Accordingly, the n pieces of the n data streams are caused to arrive at the n outputs of the barrel shifter circuitry over the course of n memory clock periods, as required. This scheme provides each input/output data stream with a continuous, non-blocking path to the central store, which is the goal of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of switching n data streams for input and output of said data streams by an n input, n output data store without data loss, said method comprising the steps of:

(a) dividing said data into n separate storage arrays;

(b) dividing each of said data streams into n equal-sized pieces;

(c) shifting each one of said data streams in $\log_2 n$ separate stages, wherein said shifting stages respectively comprise shifting each one of said data streams by $_2(\log_2 n)^{-1}$ bits in said first shifting stage, $_2(\log_2 n)^{-2}$ bits in said second shifting stage, . . . , 1 bit in said $n^{th}$ shifting stage;

(d) during each one of n separate time units:

(i) writing one of said pieces into a corresponding one of said storage arrays; or, (ii) reading one of said pieces from a corresponding one of said storage arrays;

(e) for each one of said data streams, during each one of said time units i, where $1 \leq i \leq n$, writing an $i^{th}$ one of said pieces into an $i^{th}$ one of said storage arrays, or reading an $i^{th}$ one of said pieces from an $i^{th}$ one of said storage arrays; and, (f) for each $i^{th}$ one of said data streams, during each $j^{th}$ one of said time units, writing one piece $P_{ij}$ of said pieces into an $i^{th}$ one of said storage arrays, or reading one piece $P_{ij}$ of said pieces from an $i^{th}$ one of said storage arrays.

2. Apparatus for switching n data streams for input and output of said data streams without data loss, said apparatus comprising:

(a) an n input, n output data store subdivided into n separate storage arrays;

(b) means for dividing each one of said data streams into n equal-sized pieces and for writing each one of said pieces into a corresponding one of said storage arrays during each one of n separate time units;

(c) means for reading each one of said written pieces from said respective storage arrays during each one of another n separate time units and for combining said read pieces to reform a corresponding one of said data streams;

wherein:

(i) said means for dividing said data streams and for writing said pieces, and said means for reading said written pieces and for combining said read pieces, each further comprises shifting means for shifting each one of said data streams in log2n separate stages; and, (ii) said shifting stages respectively comprise shifting each one of said data streams by $_2(\log_2 n)^{n-1}$ bits in said first shifting stage, $_2(\log_2 n)^{n-2}$ bits in said second shifting stage, . . . , and 1 bit in said $n^{th}$ shifting stage.

* * * * *